(12) United States Patent
Iwamoto

(10) Patent No.: US 7,288,340 B2
(45) Date of Patent: Oct. 30, 2007

(54) INTEGRATED BATTERY

(75) Inventor: Kazuya Iwamoto, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 572 days.

(21) Appl. No.: 10/802,911

(22) Filed: Mar. 18, 2004

(65) Prior Publication Data

US 2004/0185334 A1    Sep. 23, 2004

(30) Foreign Application Priority Data

Mar. 20, 2003    (JP)    ............................ P2003-078005

(51) Int. Cl.
*H01M 2/16*    (2006.01)
*H01M 2/18*    (2006.01)
*H01M 4/00*    (2006.01)

(52) U.S. Cl. ........................ 429/143; 429/128; 429/142

(58) Field of Classification Search ...................... None
See application file for complete search history.

(56) References Cited

U.S. PATENT DOCUMENTS 3,353,999 A    11/1967    Osborn
4,279,974 A *  7/1981    Nishio ......................... 429/104
5,141,614 A    8/1992    Akridge et al.
5,338,625 A    8/1994    Bates et al.
6,528,204 B1   3/2003    Hikmet et al.
6,582,845 B2 * 6/2003    Helfinstine et al. ........... 429/33

FOREIGN PATENT DOCUMENTS

| JP | 60-257073 | | 12/1985 |
|---|---|---|---|
| JP | 61-165965 | | 7/1986 |
| JP | 08-64213 | | 3/1996 |
| JP | 10-64514 | * | 3/1998 |
| JP | 10-247516 | | 9/1998 |
| JP | P2000-195482 | | 7/2000 |
| JP | P2000-251939 | | 9/2000 |
| JP | P2001-15153 | | 1/2001 |

* cited by examiner

*Primary Examiner*—Patrick Joseph Ryan
*Assistant Examiner*—Julian Mercado
(74) *Attorney, Agent, or Firm*—McDermott Will & Emery LLP

(57) ABSTRACT

In order to enhance reliability of a battery against bending or twisting in particular, at least one cell group comprising 4 unit cells is formed on a flexible substrate. The cell group has a rectangular shape, and is divided into the 4 unit cells by strip-shaped portions arranged along 2 diagonal lines of the rectangle.

3 Claims, 8 Drawing Sheets

FIG. 9 — *PRIOR ART*

FIG. 10--*PRIOR ART*
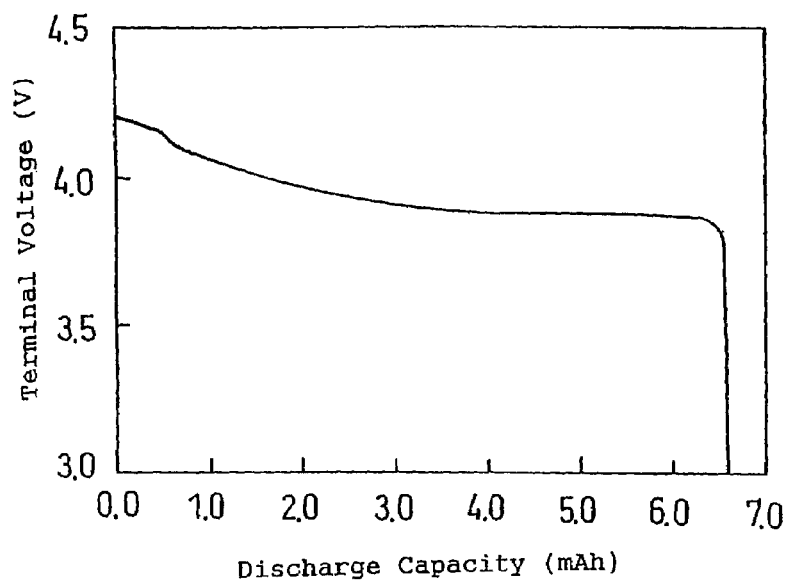
FIG. 11--*PRIOR ART*
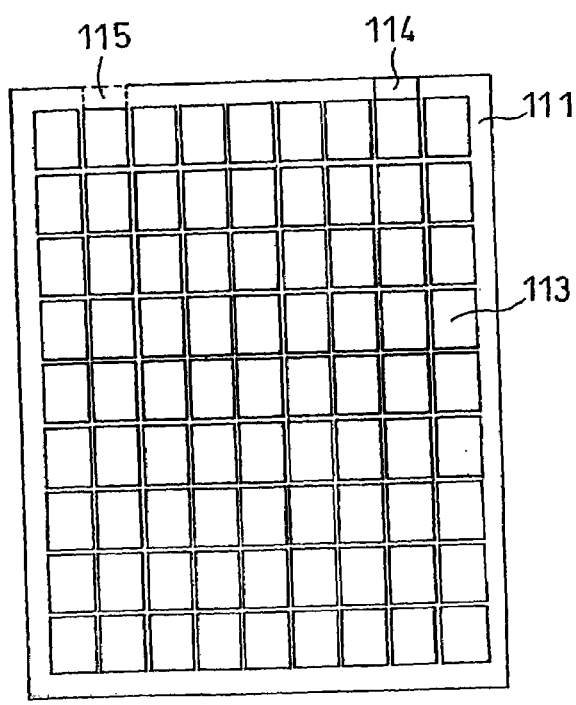

FIG. 12–*PRIOR ART*
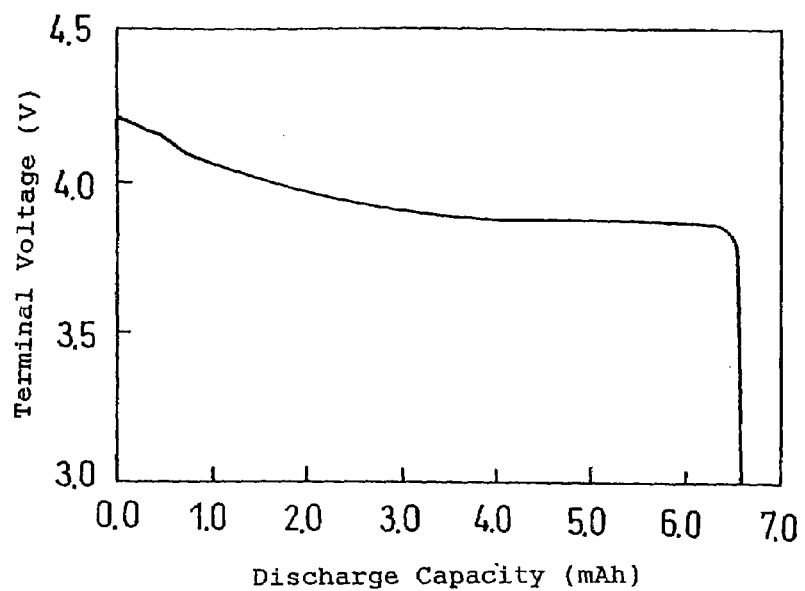
FIG. 13–*PRIOR ART*
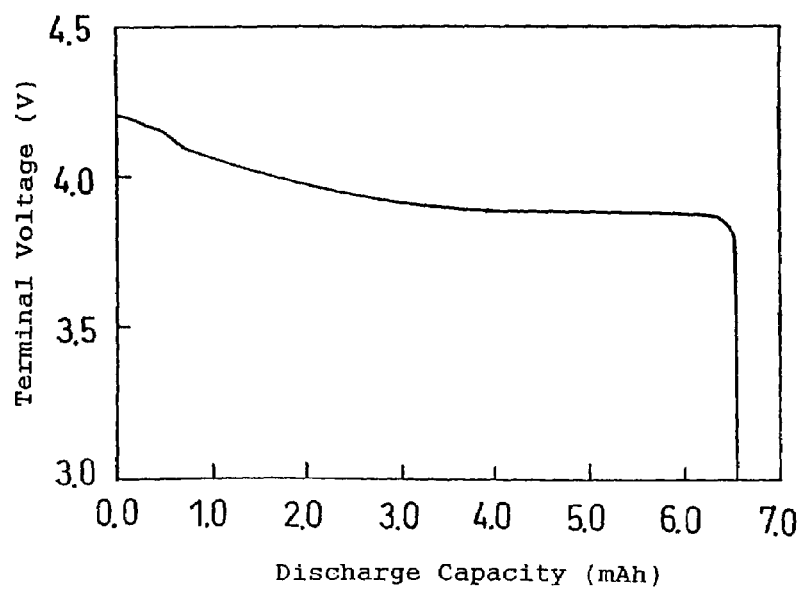

FIG. 14 -- *PRIOR ART*
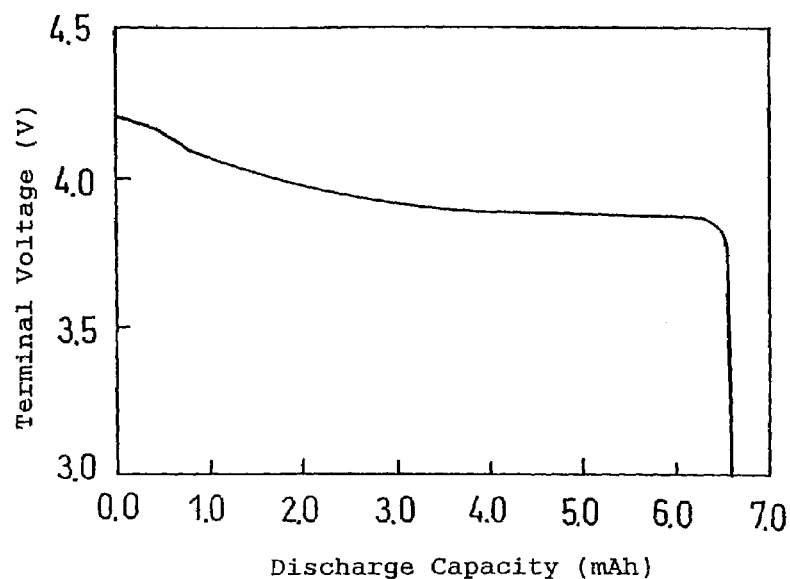
FIG. 15 -- *PRIOR ART*
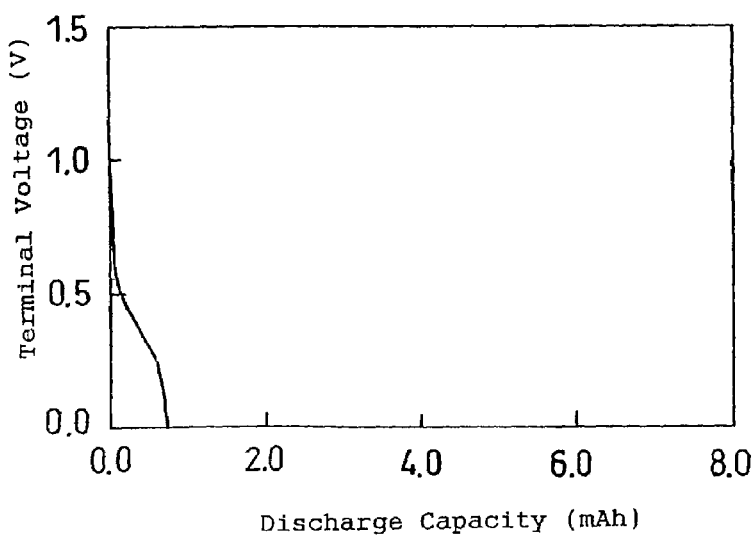

INTEGRATED BATTERY

BACKGROUND OF THE INVENTION

The present invention relates to an integrated battery, more specifically, to a flexible battery in which a plurality of unit cells are arranged on a flexible substrate.

As devices including cell phones are made smaller and their performance is improved in recent years, demand is increasing for the development of batteries as power sources for such devices. For example, the research and development of a lithium ion battery with a higher energy density and the commercialization thereof are rapidly proceeding. In such battery, an electrolyte solution comprising a liquid such as organic solvent has been used as a medium for transferring ions, which is accompanied by a possibility of leakage of an electrolyte solution from a battery.

In order to solve the problem that could harm the reliability of a battery containing such electrolyte solution, studies of an all-solid battery are under way. There are proposed, for example, an all-solid battery using a solid polymer electrolyte, instead of an electrolyte solution (see, for example, Japanese Patent Laid-Open No. 2000-251939), and an all-solid battery using an inorganic solid electrolyte (see, for example, Japanese Patent Laid-Open Nos. Sho 60-257073 and Hei 10-247516).

With the miniaturization of such devices, studies of a thinner all-solid battery are also being carried out. In order to achieve a thin all-solid battery, a proposal is made that a positive electrode, a solid electrolyte, a negative electrode and the like are formed on a certain substrate by a thin film forming process in a vacuum such as sputtering method, ion plating method and deposition method (see, for example, U.S. Pat. Nos. 5,338,625 and 5,141,614).

In order to increase capacity and to achieve a high voltage, for example, Japanese Patent Laid-Open No. Sho 61-165965 discloses that a plurality of solid cells connected in series or parallel are formed on one substrate by patterning using a mask. Further, Japanese Patent Laid-Open No. Hei 8-064213 discloses that a plurality of thin cells are stacked, wherein each thin cell comprises a positive electrode active material, a solid electrolyte and a negative electrode active material. The positive electrode active material, the solid electrolyte and the negative electrode active material are interposed between facing positive and negative electrode current collectors that also may function as jackets. In the thin cell, the peripheral area of the positive electrode current collector and that of the negative electrode current collector are adhered each other by a resin frame, and the resin frame is protruded to the outside of the peripheral area. A plurality of such thin cells are stacked and the protruded portions of the resin frames are adhered to form one stacked cell.

Solid cells as described above are typically formed on a substrate. The substrate is usually made of quartz, alumina, silicon wafer, sapphire, etc. The substrates made of such materials have excellent thermal resistance, but are usually thick and rigid. In other words, they are inflexible. Because of this, if a thin device such as IC card or RFID tag comprising such solid cell is excessively bent or twisted, the cells might be broken or cracked, resulting in decreased battery characteristics or breakdown of a battery.

In order to improve the tolerance against bending, one option is to make cells with a smaller dimension, but the battery capacity will be small.

Another option is to produce a substrate using a flexible material. A substrate made of flexible material can be made thinner than conventional substrates made of quartz, alumina, silicon wafer, sapphire, etc. Accordingly, it is possible to achieve a higher volume energy density compared to the case of using the conventional substrates.

However, if one large solid cell is formed on a flexible substrate to give a battery and the battery is bent, there is a possibility that only the solid cell is damaged, due to less flexibility of the solid cell.

Given the above, in order to achieve the tolerance against repeated bending as well as repeated impact and to attain high reliability of a battery, Japanese Patent Laid-Open Nos. 2000-195482 and 2001-15153 disclose a plurality of solid cells being arranged on a substrate in a lattice pattern, each of the solid cells having a rectangular shape and comprising a power-generating element in which a positive electrode active material, a solid electrolyte and a negative electrode active material are stacked to form a layered structure.

The battery as described above reduces a possibility of destruction of the solid cells in the case where the battery is bent along a line parallel to a side of the solid cell. The battery, however, still has a great possibility of destruction of the solid cells in the case where the battery is twisted or bent along a line parallel to a diagonal line of the solid cell.

In view of the above, it is an object of the present invention to provide a battery having sufficient capacity that can function without being damaged even if the battery is twisted.

SUMMARY OF THE INVENTION

The present invention relates to an integrated battery comprising (a) a flexible substrate and (b) at least one cell group comprising 4 unit cells arranged-on the flexible substrate; each of the unit cells comprising a positive electrode, a negative electrode and a solid electrolyte interposed between the positive electrode and the negative electrode; and the cell group having a shape of a rectangle and having strip-shaped plain portions arranged along 2 diagonal lines of the rectangle, the plain portions dividing the rectangular cell group into 4 unit cells. The term "plain portion" used herein means a portion where at least one of the positive and negative electrodes is not formed.

In the integrated battery, the strip-shaped plain portions preferably have a width twice or more times larger than the thickness of the unit cell. The thickness of the unit cell means the total thickness of the positive electrode, the negative electrode and the solid electrolyte.

In the integrated battery, the flexible substrate has a rectangular outer shape. The outer shape is geometrically similar to the shape of the cell group. The cell group is arranged on the flexible substrate such that each side of the flexible substrate and the corresponding side of the cell group are parallel.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 9 is a top plan view of a battery used in COMPARATIVE EXAMPLE 1.

FIG. 10 shows a discharge curve obtained when a battery of COMPARATIVE EXAMPLE 1 is discharged at 1 mA.

FIG. 11 is a top plan view of an integrated battery of COMPARATIVE EXAMPLE 2 showing the arrangement of unit cells in the battery.

FIG. 12 shows a discharge curve obtained when an integrated battery of COMPARATIVE EXAMPLE 2 is discharged at 1 mA.

FIG. 13 shows a discharge curve obtained after a bending test in which an integrated battery of COMPARATIVE EXAMPLE 2 is repeatedly (200 times) bent from 0° to 90° to the central axis parallel to the short side of the battery.

FIG. 14 shows a discharge curve obtained after a bending test in which an integrated battery of COMPARATIVE EXAMPLE 2 is repeatedly (200 times) bent from 0° to 90° to the central axis parallel to the long side of the battery.

FIG. 15 shows a discharge curve obtained after a twisting test in which an integrated battery of COMPARATIVE EXAMPLE 2 is repeatedly (200 times) bent from 0° to 90° to the central axis parallel to one diagonal line of the battery.

DETAILED DESCRIPTION OF THE INVENTION

An integrated battery of the present invention is described with reference to the drawings.

Figure 1:
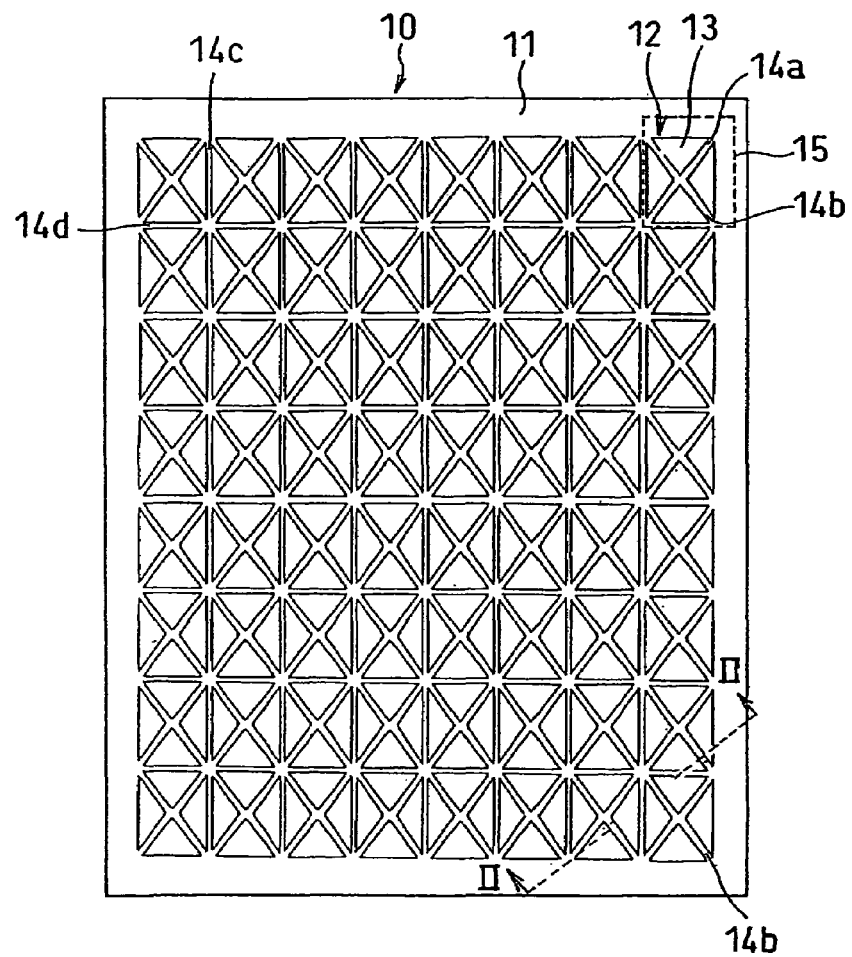
FIG. 1 is a top plan view of an integrated battery in accordance with one embodiment of the present invention showing the arrangement of unit cells in the integrated battery.
Figure 2:
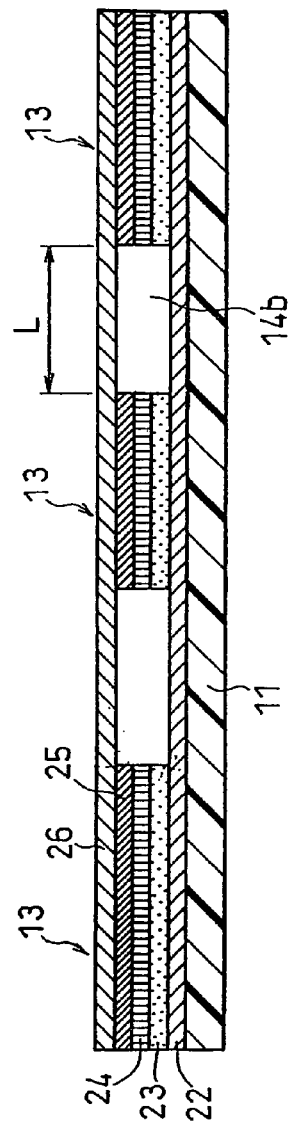
FIG. 2 is a schematic sectional view taken on line II-II in FIG. 1.

FIG. 1 shows a top plan view of an integrated battery according to one embodiment of the present invention. FIG. 2 shows a schematic sectional view taken on line II-II in FIG. 1. In FIG. 1, a negative electrode current collector for connecting individual unit cells in parallel, which is to be formed on the top of the unit cells, is not shown. The integrated batteries shown in FIGS. 1 and 2 utilize an all-solid thin film cell which comprises an inorganic solid electrolyte as a unit cell.

An integrated battery 10 comprises a flexible substrate 11 and a plurality of cell groups 12 arranged on the flexible substrate, each of the cell groups 12 comprising four unit cells 13 and having a shape of a rectangle. In the rectangular cell group, strip-shaped plain portions 14a and 14b are arranged along two diagonal lines of the rectangle. The rectangular cell group is divided into four unit cells by the plain portions 14a and 14b. In FIG. 1, one of the cell groups 12 is surrounded by a dotted line 15.

The cell groups 12 are arranged in a lattice pattern with the plain portions 14c in the vertical direction and the plain portions 14d in the horizontal direction.

As seen from FIG. 2, the unit cell 13 comprises a positive electrode current collector 22, a positive electrode 23 formed on the positive electrode current collector 22, a solid electrolyte 24 formed on the positive electrode 23, a negative electrode 25 formed on the solid electrolyte 24 and a negative electrode current collector 26 formed on the negative electrode 25. The positive electrode and the negative electrode can be replaced with each other.

The positive electrode current collector 22 and the negative electrode current collector 23 are formed continuously, even in the plain portions. This enables all power-generating elements, each element comprising the positive and negative electrodes and the solid electrolyte, to connect in parallel.

As seen from FIG. 2, between adjacent unit cells 13 is arranged a strip-shaped plain portion 14b with a width of L. The line II-II of FIG. 1 intersects the strip-shaped plain portions 14b at right angles. The term "plain portion" used herein means a portion where at least one of the positive and negative electrodes is not formed as shown in FIG. 2.

The negative electrode current collector is not necessarily formed in the plain portions, and may be formed on an individual power-generating element. In the case of forming the negative electrode current collector on an individual power-generating element, all the negative electrode current collectors should be connected by a lead so that the unit cells are connected in parallel.

In the present invention, the flexible substrate 11 may be made of resin. Particularly, it is preferable to use a substrate made of at least one resin selected from the group consisting of polyimide and polyethylene terephthalate. The substrate may be in the form of a film or a sheet. A metal foil such as stainless steel foil or nickel foil can also be used as the flexible substrate. However, from a viewpoint of enhancing reliability against short-circuiting, a substrate made of resin as stated above is more preferable. When a metal foil as listed above is used as the flexible substrate 11, an insulating layer made of silicon dioxide or the like is preferably formed on the surface of the metal foil.

The positive electrode current collector 22 can be made of any electron conductive material that can be formed into a thin film. It is preferred to use at least one selected from the group consisting of gold, platinum, titanium, chromium, cobalt, aluminum, indium oxide, tin oxide and indium oxide-tin oxide.

The positive electrode 23 can be made of any material for positive electrode that can be formed into a thin film. In the case where the solid cell is a lithium secondary cell, the positive electrode is preferably made of at least one selected from the group consisting of lithium cobalt oxide, lithium nickel oxide, lithium manganese oxide, lithium iron phosphate, lithium cobalt phosphate, lithium manganese phosphate, lithium nickel phosphate, vanadium oxide, titanium disulfide, molybdenum disulfide and the like.

The solid electrolyte 24 can be made of any material for solid electrolyte that can be formed into a thin film. In the case where the solid cell is a lithium secondary cell, the solid electrolyte is preferably made of at least one selected from the group consisting of lithium phosphorus oxynitride ($Li_xPO_yN_z$), lithium titanium phosphate ($LiTi_2(PO_4)_3$), lithium germanium phosphate ($LiGe_2(PO_4)_3$), $Li_2O$—$SiO_2$, $Li_3PO_4$—$Li_4SiO_4$, $Li_2O$—$V_2O_5$—$SiO_2$, $Li_2O$—$P_2O_5$—$B_2O_3$, $Li_2O$—$GeO_2$, $Li_2S$—$SiS_2$, $Li_2S$—$GeS_2$, $Li_2S$—$GeS_2$—$Ga_2S_3$, $Li_2S$—$P_2S_5$ and $Li_2S$—$B_2S_3$. A material prepared by doping the above with a different element; a lithium halide such as LiI; $Li_3PO_4$; $LiPO_3$; $Li_4SiO_4$; $Li_2SiO_3$; $LiBO_2$ or the like can also be used. The solid electrolyte may be crystalline, amorphous or glassy.

The negative electrode 25 can be made of any material for negative electrode that can be formed into a thin film. In the case where the solid cell is a lithium secondary cell, the negative electrode is preferably made of at least one selected from the group consisting of metallic lithium, a lithium alloy, aluminum, indium, tin, antimony, lead, silicon, lithium nitride, $Li_{2.6}Co_{0.4}N$, $Li_{4.4}Si$, lithium titanate and graphite.

The negative electrode current collector 26 can be made of any electron conductive material that can be formed into a thin film. The negative electrode current collector is preferably made of at least one selected from the group consisting of gold, platinum, titanium, chromium, cobalt, copper, iron, indium oxide, tin oxide and indium oxide-tin oxide.

In the case where the positive electrode 23 is a lithium-containing compound, the negative electrode current collector 26 may be formed directly on the solid electrolyte without forming the negative electrode therebetween. This is because the initial charge causes the lithium metal to be deposited between the solid electrolyte and the negative electrode current collector 26 to form a negative electrode, which enables the battery to function.

As stated above, in the present invention, at least one cell group comprising 4 unit cells is arranged on the flexible substrate. The cell group is divided into 4 unit cells by the strip-shaped plain portions arranged along 2 diagonal lines of the rectangle. Because the unit cells are arranged with some space given to each other due to the 2 strip-shaped plain portions arranged along 2 diagonal lines of the rectangle, the possibility of contact between the unit cells or the possibility of damage to the battery is reduced if the battery is twisted.

In the present invention, the unit cells constituting one cell group 12 may have the same capacity. This enables, when an integrated battery is produced by connecting the unit cells in parallel for example, all the unit cells to be sufficiently charged at one time.

Moreover, by arranging a plurality of cell groups 12 on the substrate in a lattice pattern as shown in FIG. 1, the plain portions are formed vertically, horizontally and diagonally on the substrate. The structure like this reduces the possibility of damage to the battery not only when the battery is twisted but also when the battery is bent vertically or horizontally.

The integrated battery is also exposed to the possibility of being twisted at various angles. Accordingly, it is effective to control the relation among a thickness of the unit cell (h), a width of the plain portion (L) and a bending angle at the time when adjacent unit cells come in contact (θ). The thickness of the unit cell and the width of the plain portion are determined according to the largest twist angle or the largest bending angle when a thin device using the integrated battery of the present invention is twisted or bent to the degree that the device is not damaged. It is considered that such designing completely prevents damage to the unit cells even when the device is bent or twisted at the largest angle expected.

Figure 3:
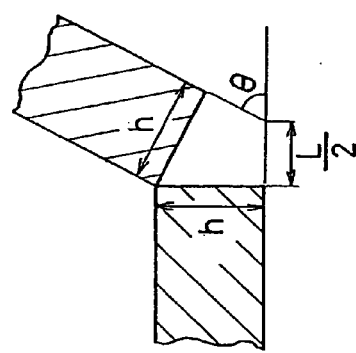
FIG. 3 is a diagram showing one of relations among a unit cell thickness "h", a width of plain portion "L" and a bending angle "θ".

The relation among a unit cell thickness "h", a plain portion width "L" and a bending angle "θ" is explained referring to FIG. 3 as one example.

When an integrated battery comprising the unit cells having a thickness of "h" is bent along a diagonal line of the cell group, the relation among "h", "L" and "θ" is represented by the equation:

$$2h/L = \tan((180-\theta)/2) \ (0° < \theta \leq 90°).$$

In the equation, "θ" represents a bending angle at the time when adjacent unit cells come in contact and "L" represents a width of the plain portion in the cross section vertical to the bending axis.

From the above equation, a unit cell thickness "h" and a plain portion width "L" suitable for the largest bending angle or the largest twist angle and that can prevent damage to the unit cells are determined.

If the bending angle is about 50°, for example, the unit cell thickness "h" is 10 μm, and the plain portion width "L" is 10 μm. In a battery produced according to these figures, unit cells do not contact each other so that damage to unit cells can be prevented.

Particularly, in order for an integrated battery of the present invention to function even when it is bent or twisted at an angle of 90°, the width of the plain portion "L" for separating unit cells is preferably twice or more times larger than the unit cell thickness "h".

In the present invention, it is preferable that the shape of the flexible substrate is geometrically similar to that of the cell group, and that the cell group is arranged on the flexible substrate such that each side of the flexible substrate and the corresponding side of the cell group are parallel. Further preferably, the cell group is arranged on the flexible substrate such that strip-shaped plain portions parallel to diagonal lines of the rectangular flexible substrate are formed and the formed strip-shaped plain portions run through the center of gravity of the flexible substrate. Thereby, the force applied to the substrate and that to the cell group become the same, and the force is likely to spread in diagonal directions of the cell group.

In the case of arranging a plurality of the cell groups on the flexible substrate as shown in FIG. 1, individual cell groups are preferably arranged such that a strip-shaped plain portion parallel to one diagonal line of one cell group is linearly connected to that of another cell group, and the plain portion formed by connecting the strip-shaped plain portions of individual cell groups is preferably parallel to a diagonal line of the rectangular flexible substrate. The reason for this is the same as stated above.

Now, a method for producing the integrated battery of the present invention is described referring again to FIGS. 1 and 2.

The integrated battery shown in FIG. 1 is essentially produced by stacking the positive electrode current collector, the positive electrode, the solid electrolyte, the negative electrode and the negative electrode current collector on the flexible substrate as shown in FIG. 2. During the production process, the shape of individual unit cells and the width of the plain portions can be determined by using a mask having a predetermined pattern.

In the following, the production method of the present invention is specifically described.

First, one large positive electrode current collector layer is formed on a flexible substrate using a material for positive electrode current collector listed earlier. The shape and size of the positive electrode current collector layer depends on the shape and number of cell group to be formed.

The current collector layer is formed by a method such as vacuum deposition method, sputtering method, CVD method, printing method or sol-gel method. Incidentally, a positive electrode layer, a solid electrolyte layer, a negative electrode layer and a negative electrode current collector layer are also formed by a thin film forming process such as vacuum deposition method, sputtering method, CVD method, printing method or sol-gel method.

Then, a positive electrode layer is formed on the positive electrode current collector layer with the use of a material for positive electrode listed earlier by patterning using a mask having openings corresponding to the positions of unit cells as shown in FIG. 1. Due to the patterning, the produced positive electrode layer is divided. In the case where the positive electrode layer is made of lithium cobalt oxide, a heat treatment is preferably performed after the formation of the positive electrode layer.

Then, a solid electrolyte layer is formed on the positive electrode layer with the use of a material for solid electrolyte listed earlier by patterning using the same mask as above. Alternatively, instead of the thin film forming process, a solid polymer electrolyte prepared by dissolving a lithium salt in a polyethylene oxide, polypropylene oxide or the like is applied onto the positive electrode layer, which is then dried to form a solid electrolyte layer.

Then, a negative electrode layer is formed on the solid electrolyte layer with the use of a material for negative electrode listed earlier by patterning using the same mask as above. Similar to the positive electrode layer, the negative electrode layer is also divided.

Finally, one large negative electrode current collector layer is formed on the negative electrode layer using a material for negative electrode current collector listed earlier such that the negative electrode current collector layer attaches the entire divided negative electrode. Similar to the positive electrode current collector layer, the shape and size of the negative electrode current collector layer depends on the shape and number of cell groups to be formed. Thereby, an integrated battery as shown in FIG. 1 is produced.

In the case where the integrated battery of the present invention is installed in an IC card, RFID tag or the like, the cells formed on the flexible substrate may partially be removed and other element such as a semiconductor chip may be replaced. Alternatively, a plain area may be formed beforehand for the chip.

In the following, the present invention is described based on EXAMPLEs, but it is to be understood that the present invention is not limited to them.

EXAMPLE 1

(Production of Integrated Battery)

First, a 1 μm-thick platinum layer with predetermined shape and size was formed on a polyimide film (flexible substrate) 41 with a thickness of 50 μm, a width of 5 cm and a length of 8 cm by RF magnetron sputtering. The obtained layer was referred to as the positive electrode current collector layer.

Figure 4:
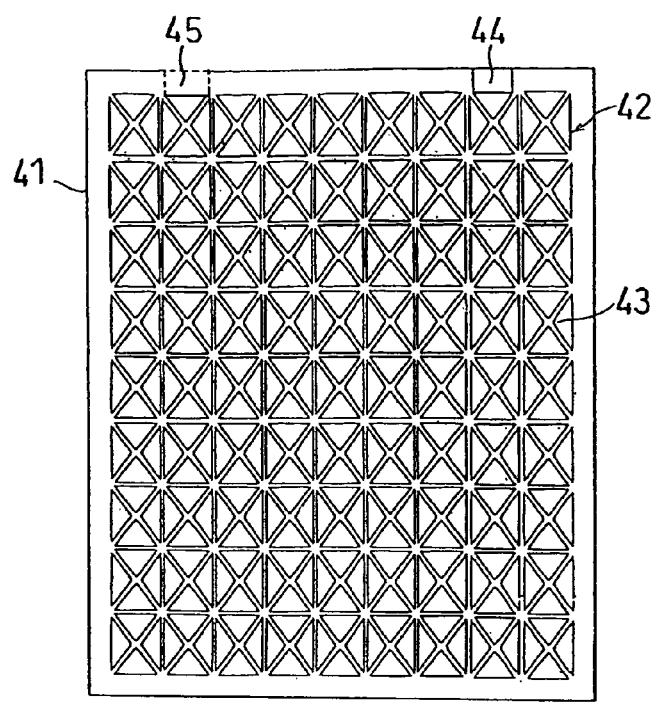
FIG. 4 is a top plan view of an integrated battery according to one embodiment of the present invention.

Then, a 3 μm-thick positive electrode layer was formed on the positive electrode current collector layer by RF magnetron sputtering in a mixed gas of argon and oxygen. During the process, a mask was used so that 81 cell groups would be formed in a lattice pattern as shown in FIG. 4. With the use of the mask, all the plain portions had a width of 20 μm, and each cell group had a width of 5 mm and a length of 8 mm. This mask was used also when preparing a negative electrode layer.

After the formation of the positive electrode layer, the substrate was heat-treated at 350° C. for 48 hours.

Subsequently, a 1.5 μm-thick solid electrolyte layer was formed on the positive electrode layer by RF magnetron sputtering using a lithium phosphorus oxynitride target in nitrogen gas atmosphere.

Then, metallic lithium was deposited on the solid electrolyte layer by a resistance heating deposition method to form a 2 μm-thick negative electrode layer.

Then, a 1 μm-thick platinum layer with predetermined shape and size was formed on the negative electrode layer such that the platinum layer attached the entire divided negative electrode. The formed layer was referred to as the negative electrode current collector. Thereby, 81 cell groups 42, each cell group comprising 4 unit cells 43, were arranged on the polyimide film 41 in a lattice pattern as shown in FIG. 4 (the negative electrode current collector is not shown in the figure). Finally, a positive electrode terminal 44 and a negative electrode terminal 45 (shown by a dotted line) were formed to give an integrated battery.

Figure 5:
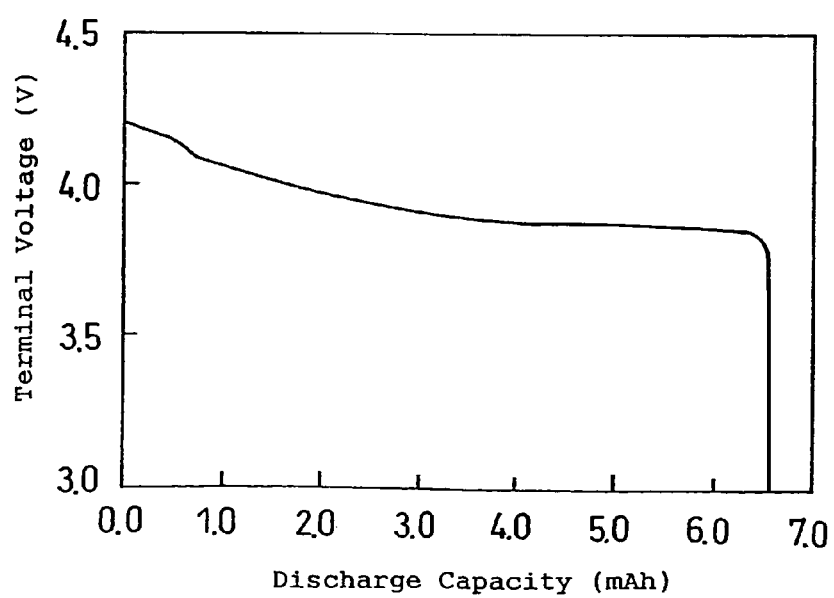
FIG. 5 is a graph showing a discharge curve when an integrated battery according to one embodiment of the present invention is discharged at 1 mA.

In the produced integrated battery, one unit cell had a capacity of 82 μAh and a thickness of 8.5 μm. The integrated battery itself had a capacity of 6.6 mAh and an open circuit voltage of 3.7 V. FIG. 5 shows a discharge curve obtained when the produced integrated battery was discharged at 1 mA.

(Flexural Test)

The produced integrated battery was put through the following 3 types of flexural tests.
(i) Bending test in which the battery was repeatedly (200 times) bent from 0° to 90° to the central axis parallel to the short side of the battery.
(ii) Bending test in which the battery was repeatedly (200 times) bent from 0° to 90° to the central axis parallel to the long side of the battery.
(iii) Twisting test in which the battery was repeatedly (200 times) bent from 0° to 90° along one diagonal line of the battery.

Figure 6:
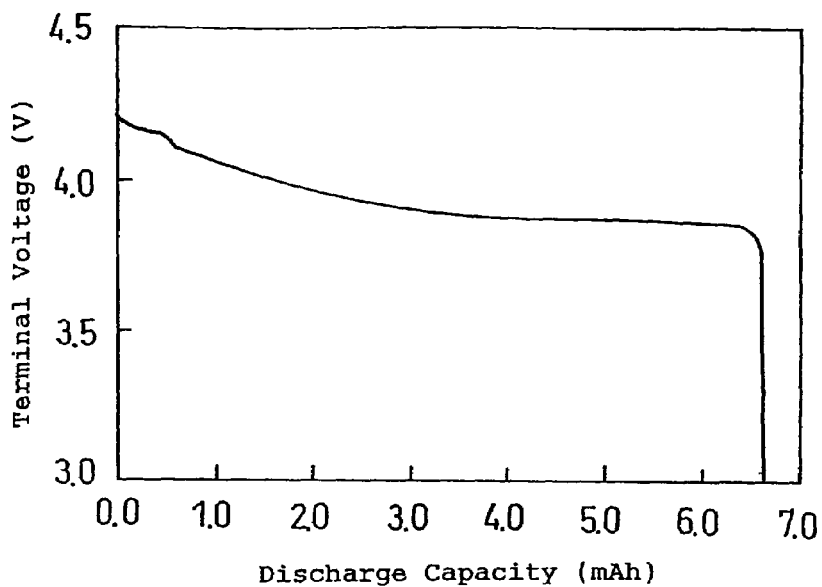
FIG. 6 is a graph showing a discharge curve obtained after a bending test in which an integrated battery according to one embodiment of the present invention is repeatedly (200 times) bent from 0° to 90° to the central axis parallel to the short side of the battery.
Figure 7:
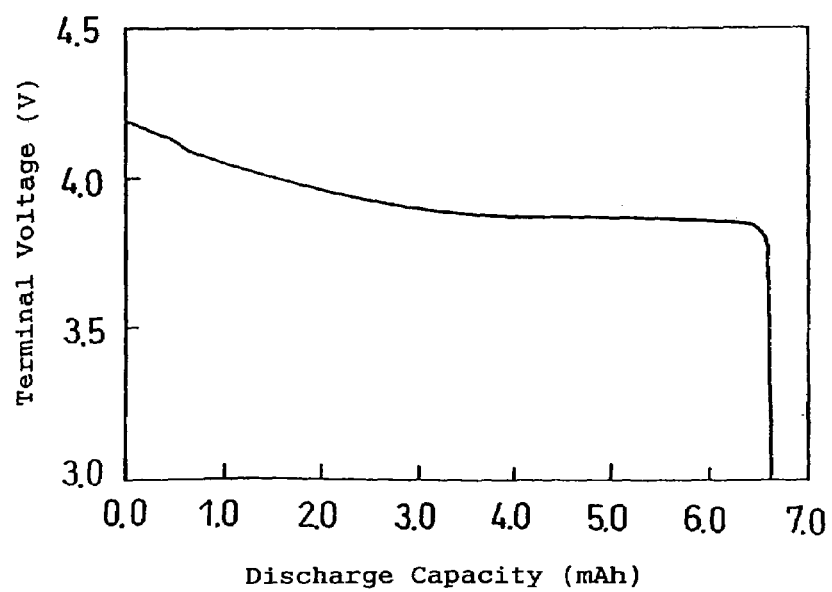
FIG. 7 is a graph showing a discharge curve obtained after a bending test in which an integrated battery according to one embodiment of the present invention is repeatedly (200 times) bent from 0° to 90° to the central axis parallel to the long side of the battery.
Figure 8:
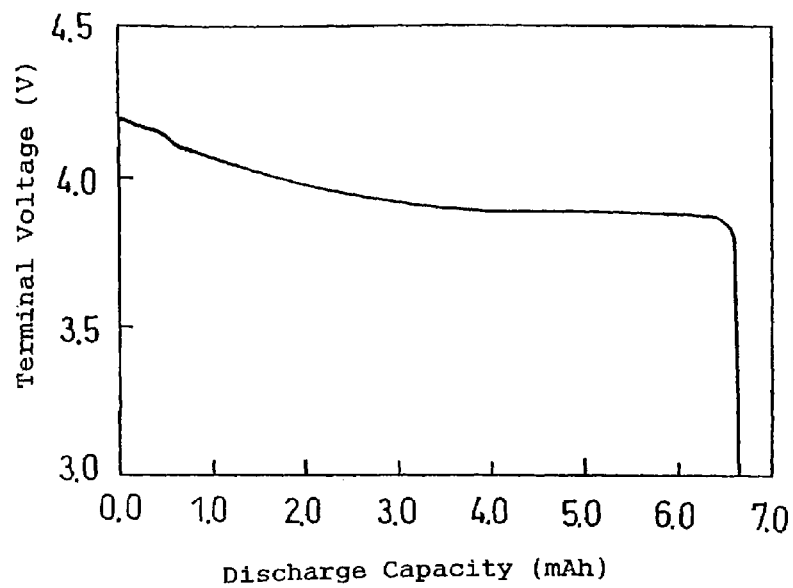
FIG. 8 is a graph showing a discharge curve obtained after a twisting test in which an integrated battery according to one embodiment of the present invention is repeatedly (200 times) bent from 0° to 90° along one diagonal line of the battery.
Figure 8:
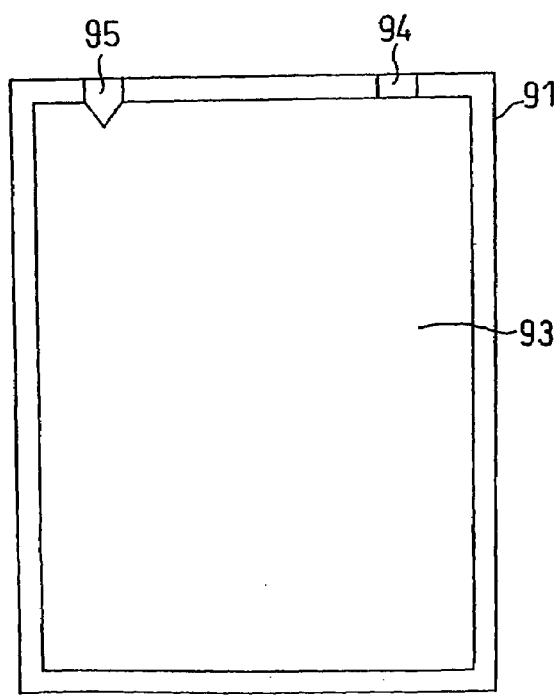

After each of the flexural tests, the discharge curve was measured. The results are shown in FIGS. 6, 7 and 8.

As obvious from the comparisons between FIG. 5 and FIGS. 6, 7 and 8, the discharge characteristics of the integrated battery of the present invention did not deteriorate even after the flexural tests. This has proved that the integrated battery of the present invention is an integrated battery with excellent flexibility, which is unlikely to be damaged even when it is bent or twisted.

EXAMPLE 2

An integrated battery was produced in the same manner as in EXAMPLE 1 except that the width of the plain portions was changed to 10 μm. The produced integrated battery had an open circuit voltage of 3.7 V and a discharge capacity of 6.6 mAh.

The integrated battery was put through the same flexural tests as in EXAMPLE 1. As a result, its open circuit voltage lowered to 1.8 V, and its unit cells were partially damaged.

Another flexural tests were performed in the same manner as in EXAMPLE 1, but the bending angle was changed to 45°. As a result, the discharge characteristics did not deteriorate after the flexural tests. In the case of this integrated battery, unit cells did not suffer any damage until the battery was bent to about 60°.

COMPARATIVE EXAMPLE 1

A integrated battery was produced in the same manner as in EXAMPLE 1 except that one unit cell 93 with a length of 7.2 cm and a width of 4.5 cm was arranged on a polyimide film 91, and a positive electrode terminal 94 and a negative electrode terminal 95 were formed, as shown in FIG. 9. The produced battery had an open circuit voltage of 3.7 V and a discharge capacity of 6.6 mAh. FIG. 10 shows a discharge curve obtained when the produced battery was discharged at 1 mA.

This battery was put through the same flexural tests as in EXAMPLE 1. As a result, the battery having one large unit cell formed therein did not endure any of the flexural tests (200 times). More specifically, the battery suffered damage and could not function. Its open circuit voltage was measured and it was found that the voltage lowered to 1.2 V, and therefore the unit cells were damaged.

COMPARATIVE EXAMPLE 2

An integrated battery was produced in the same manner as in EXAMPLE 1 except that, instead of cell groups comprising 4 unit cells, rectangular unit cells 113 with a length of 8 mm and a width of 5 mm were arranged on a polyimide film 111 in a lattice pattern as shown in FIG. 11 (the negative electrode current collector is not shown in the figure), and a positive electrode terminal 114 and a negative electrode terminal 115 (shown by a dotted line) were formed. The width of the plain portions was set to 20 μm like EXAMPLE 1. The produced battery had an open circuit voltage of 3.7 V and a discharge capacity of 6.6 mAh. FIG. 12 shows a discharge curve obtained when the produced battery was discharged at 1 mA.

This battery was put through the same flexural tests as in EXAMPLE 1. FIG. 13 shows a discharge curve obtained after the test in which the battery was repeatedly (200 times) bent from 0° to 90° to the central axis parallel to the short side of the integrated battery. FIG. 14 shows a discharge curve obtained after the test in which the battery was repeatedly (200 times) bent from 0° to 90° to the central axis parallel to the long side of the battery. FIG. 15 shows a discharge curve obtained after the test in which the battery was repeatedly (200 times) bent from 0° to 90° along one diagonal line of the battery.

When the battery was bent to the central axis parallel to the short side or long side of the battery (FIGS. 13 and 14), the battery exhibited a discharge curve similar to that shown in FIG. 12 even after the flexural test. When the battery was bent along one diagonal line of the battery, on the other hand (FIG. 15), the integrated battery suffered damage and could not function. Its open circuit voltage at this time was measured and it was found that the voltage lowered to 1.2 V, and therefore the unit cells were damaged.

As described above, according to the present invention, it is possible to obtain an integrated battery with high reliability against bending or twisting in particular, whose discharge characteristics do not deteriorate even after it is bent or twisted.

In EXAMPLEs described above, an all-solid thin film lithium secondary battery comprising a positive electrode made of lithium cobalt oxide, a negative electrode made of metallic lithium, and a solid electrolyte made of lithium phosphorus oxynitride was used, but the present invention is not limited to the above. In the present invention, a solid cell using other materials, namely, a solid cell using a solid polymer electrolyte as the solid electrolyte can also be used. Furthermore, the present invention is applicable as a battery housed in a metal case or plastic case.

Likewise, in EXAMPLEs, RF magnetron sputtering method was used as the film forming method, but any method can be used as long as a film can be formed thereby; namely, other sputtering method, ion plating method, CVD method, heat deposition method, printing method, sol-gel method or plating method.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An integrated battery comprising
   (a) a flexible substrate and
   (b) at least one cell group comprising 4 unit cells arranged on said flexible substrate;
   each of said unit cells comprising a positive electrode, a negative electrode and a solid electrolyte interposed between said positive electrode and said negative electrode, and
   said cell group having a shape of a rectangle and having strip-shaped plain portions arranged along 2 diagonal lines of said rectangle, said plain portions dividing said rectangular cell group into said 4 unit cells.

2. The integrated battery in accordance with claim 1, wherein said strip-shaped plain portions have a width twice or more times larger than the thickness of said unit cell.

3. The integrated battery in accordance with claim 1, wherein said flexible substrate has a rectangular outer shape, said outer shape being geometrically similar to said shape of said cell group, and said cell group is arranged on said flexible substrate such that each side of said flexible substrate and the corresponding side of said cell group are parallel.

* * * * *